Nov. 16, 1965 W. W. TAYLOR ETAL 3,218,082

VACUUM CLEANER ATTACHMENT FOR RECORD PLAYER

Filed Nov. 16, 1962 2 Sheets-Sheet 1

William W. Taylor
Richard O. Spencer
INVENTORS

BY Clarence A. O'Brien and Harvey B. Jacobson
Attorneys

VACUUM CLEANER ATTACHMENT FOR RECORD PLAYER

Filed Nov. 16, 1962 2 Sheets-Sheet 2

William W. Taylor
Richard O. Spencer
INVENTORS

BY Clarence A. O'Brien
and Harvey B. Jacobson
Attorneys

United States Patent Office 3,218,082

Patented Nov. 16, 1965

3,218,082

VACUUM CLEANER ATTACHMENT FOR RECORD PLAYER

William W. Taylor, Malibu, Calif. (16472 Malden Circle, Huntington Beach, Calif.), and Richard O. Spencer, Pacific Palisades, Calif. (16502 Somerset Lane, Huntington Beach, Calif.)

Filed Nov. 16, 1962, Ser. No. 238,138
8 Claims. (Cl. 274—47)

This invention comprises a novel and useful vacuum cleaner attachment for record players and more particularly pertains to a suction operated cleaning device adapted to continuously clean the surface of a record during the playing of a recording thereon.

Heretofore, the unavoidable presence and accumulation of dirt and dust in the sound track of a record not only detrimentally affects the reproducing of the recording thereon but also results in excessive wear attrition of the recording groove. In attempting to overcome this difficulty, various cleaning operations have been resorted to including the manual brushing of the record and the sound grooves thereof. However, these all require unremitting attention on the part of the operator of the record player.

It is therefore the primary purpose of this invention to provide a device which will automatically clean the sound track of a record disc whenever the recording is reproduced by a record player.

A further object of the invention is to provide a cleaning device in accordance with the foregoing object which will avoid any attrition and wear of the record during the cleaning operation through the use of vacuum applied by a suction head during the playing of the record.

A further object of the invention is to provide a cleaning device in accordance with the foregoing object which shall be compactly incorporated into a record player of any conventional type either as an attachment applied to an existing record player or as a built-in component of the record player.

Yet another object of the invention is to provide a vacuum cleaner attachment in accordance with the foregoing objects which shall be automatically rendered operative and inoperative in timed relation to the cyclic operation of the record player during the record changing and other phases of its cyclic operation.

Yet another object of the invention is to provide a vacuum cleaner attachment for record players which shall be operatively connected to and make use of existing conventional components of a record player in order to perform its cleansing functions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
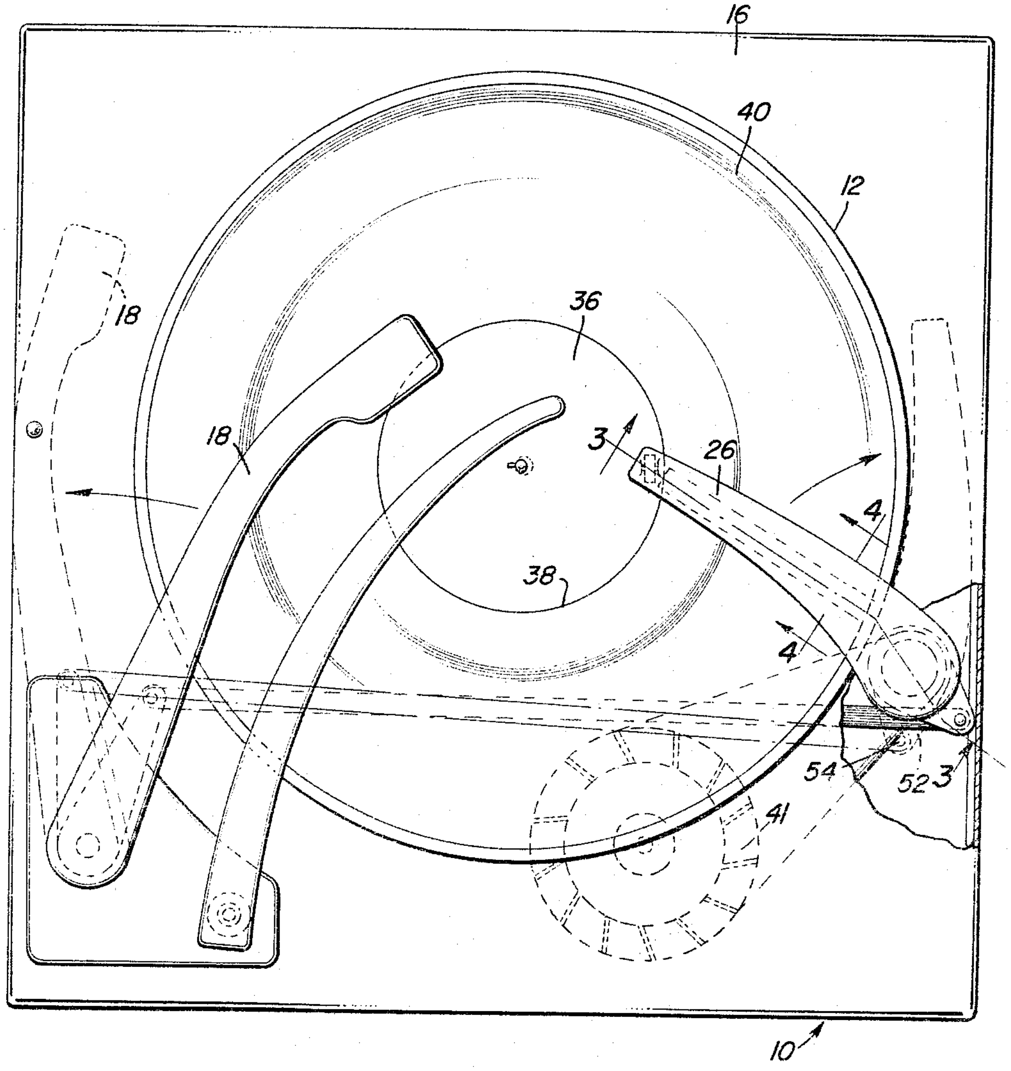
FIGURE 1 is a top plan view of a portion of a conventional record player, certain parts being broken away and concealed parts and alternative positions of parts being shown in dotted lines therein and showing the cleaning attachment of this invention applied thereto.

In the accompanying drawings, the numeral 10 designates generally the cabinet of any conventional automatic record player which encloses the mechanism thereof. This cabinet mounts the usual rotary turntable 12 which is driven in the conventional manner by a friction drive by an electric turntable motor 14 which is mounted within the cabinet and below the top wall 16 thereof. There is also shown provided the usual tone arm 18 forming a part of the recording producing mechanism of the record player and which is mounted upon a tone arm support post 20 forming a part of the automatic record changer mechanism of a conventional record player.

Also shown at 22 is the usual spindle by which a stack of records 24 is supported above the turntable until released for individual playing by the tone arm.

Figure 2:
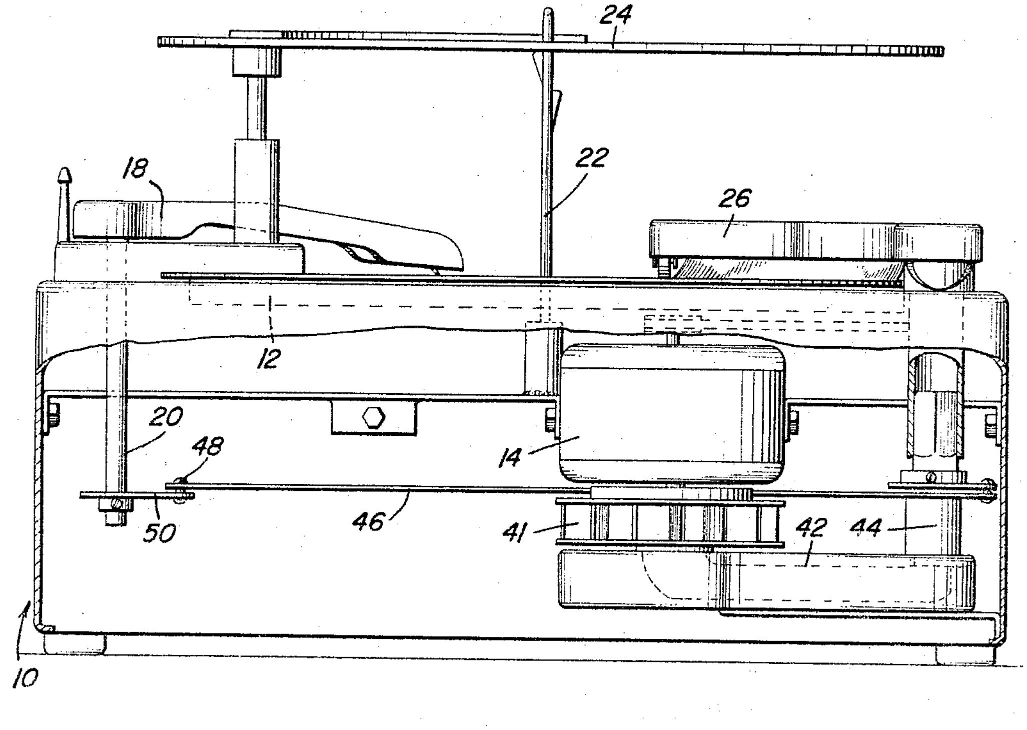
FIGURE 2 is a vertical transverse sectional view through the apparatus of FIGURE 1, parts being shown in elevation and showing certain details of the operating mechanism and the operative connection of the cleaning attachment to conventional parts of a record player.
Figures 3, 5:
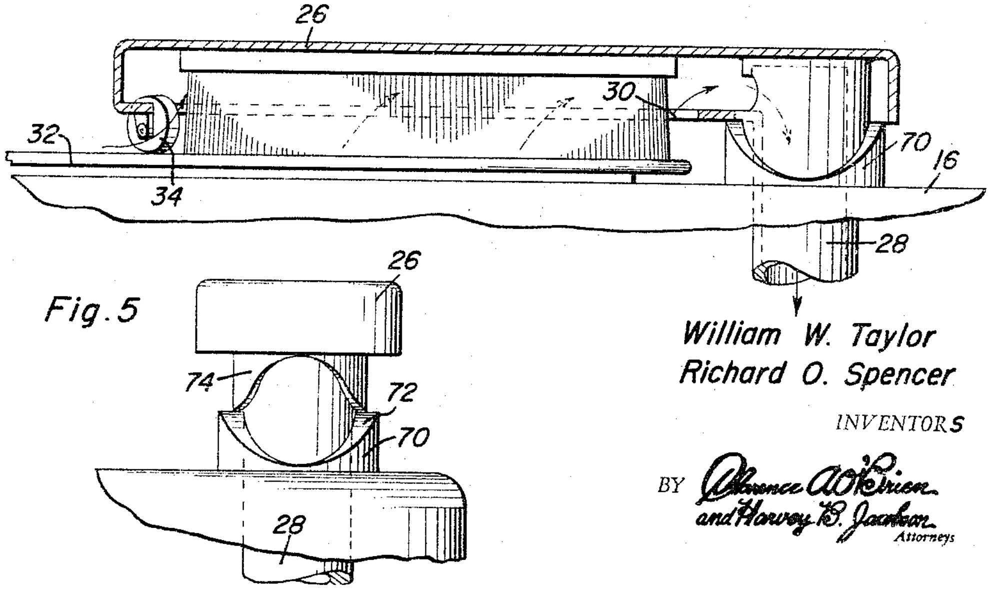
FIGURE 3 is a detail view taken upon an enlarged scale substantially upon the plane indicated by the section line 3—3 of FIGURE 1 and showing certain details of the suction head and the airflow therethrough of the invention.
FIGURE 5 is a further detail view taken upon an enlarged scale and in side elevation showing the suction head elevating means forming a part of the mounting and actuating means of the invention.

In accordance with this invention there is also mounted above the top wall 16 of the record player a suction head 26 in the form of an elongated arm resembling the tone arm and which likewise is carried at one end by a tubular vertical support post 28, see FIGURES 2 and 3 in particular, and which support post is capable of an oscillatory swinging movement.

Figure 4:
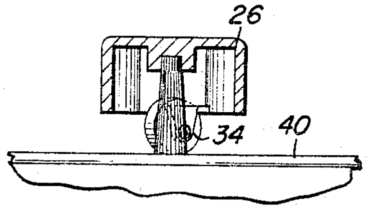
FIGURE 4 is a detail view in vertical transverse section taken upon an enlarged scale substantially upon the plane indicated by the section line 4—4 of FIGURE 1.

As shown in FIGURE 3, the suction head 26 has its lower side open to provide a suction inlet slot or opening 30 disposed closely adjacent to and above a record disc 32 when the latter is mounted upon the turntable. A supporting element in the form of one or more supporting rollers or other antifriction members 34 is journaled upon the suction head and depends therebeneath as shown in FIGURES 3 and 4 in particular so that when the suction head is lowered upon the record disc, it will be supported at one end by the support post 28 and at the other end by the elements 34 which rest against the record disc. As shown in FIGURE 1, these elements rest in the central portion 36 of a record disc and within the inner termination 38 of the sound track portion 40 of the disc. Thus, the rolling engagement of the elements 34 upon the record disc are at a location at the center of the disc and where it cannot contact the sound track of the disc.

A source of suction is connected to the suction head. This suction source includes a suction fan 41 which preferably comprises a blower fan which is secured to the armature of the turntable motor 14 or is operatively connected thereto in any desired manner. This fan through a conduit system applied suction through the lower duct member 42 which communicates by means of an upwardly projecting tube 44 which is oscillatably embraced by the lower end of the support tube 28.

It should be noted that the support tube is capable of oscillatory movement about its vertical axis in order to swing the suction head from a position shown in full lines in FIGURE 1 which is the operative cleaning position of the suction head and a dotted line position shown in FIGURE 1 which is the idle or inoperative position and in which the suction head is moved out of the way of the record disc during the cyclic operation of the record changer mechanism.

An interconnecting means indicated by the link 46 of FIGURE 2 is connected as by a pivot 48 and a crank arm 50 to a portion of the record changer mechanism such as the tone arm support post 20 and to a corresponding crank arm 52, see FIGURE 1, which is pivotally connected as at 54. Thus, each time the record changer mechanism swings the tone arm to or from the record disc, it also simultaneously moves the suction head to or from the disc. Consequently, both tone arm and suction head are simultaneously moved out of the way of the record disc during the record changing operation of the record player and both are simultaneously set down upon the disc when the reproducing of the recording on the record disc is begun by the record player.

In order to effect this cyclic operation of the suction head in synchronization with the cyclic operation of the tone arm, it is necessary to lift the suction head and lower it in the same manner as that required for the tone arm. In order to effect this purpose there is provided an elevating means of a simple construction shown in particular in FIGURE 5. As shown in this figure, there is provided a stationary cam 70 upon the top wall 16 of the record player cabinet and which is provided with an axially extending actuating cam surface 72. This cam surrounds the tubular suction head support post 28 and cooperates with a depending axial cylindrical cam 74 provided upon the suction head 26 and which likewise surrounds the support post 28. The result is that upon oscillation of the suction head, the cams 72 and 74 will effect timed raising or lowering of the suction head above the record disc to permit the suction head to be swung between its two positions, and to lower the suction head upon the record disc into its operative position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A record player comprising a cabinet enclosing record player operating mechanism, a turntable mounted upon the top of said cabinet for rotation about a vertical axis and means including a tone arm and operating means connected thereto for reproducing the sound recording of a record disk mounted on said turntable, a record disk cleaner comprising a cleaning element, support means mounting said cleaning element independently of said tone arm of said sound reproducing means for swinging movement in a horizontal plane above said turntable between an operative position above and out of contact with but in closely spaced proximity to a record disk upon said turntable for cleaning said record disk and an inoperative position above and at one side of said record disk and turntable, means connected to said tone arm operating means for moving said cleaning element from one to the other of said positions in synchronization with movement of said tone arm.

2. The combination of claim 1 wherein said cleaning element extends across substantially the entire width of the sound recording portion of the disk and simultaneously cleans said entire width of said sound recording portion.

3. The combination of claim 1 wherein said cleaning element consists of a suction head having a suction inlet means overlying and extending outwardly from the center portion of said disk, said support means including a support post extending into said cabinet and journaled for oscillating movement about a vertical axis, means communicating with said suction head for providing suction within the latter.

4. The combination of claim 3 wherein said suction producing means comprises a source of suction within said cabinet, said support post being hollow and communicating with said suction source and with said suction head.

5. A record player comprising a cabinet enclosing record player operating mechanism, a turntable mounted upon the top of said cabinet for rotation about a vertical axis and means for reproducing the sound recording of a record disk mounted on said turntable, a record disk cleaner comprising a cleaning element, support means mounting said cleaning element independently of said sound reproducing means for swinging movement in a horizontal plane above said turntable between an operative position above and out of contact with but in closely spaced proximity to a record disk upon said turntable for cleaning said record disk and an inoperative position above and at one side of said record disk and turntable, means for moving said cleaning element from one to the other of said positions, said support means including a support post carrying at its upper end said cleaning element, means effecting both axial and oscillatory movement of said support post and simultaneously oscillating and lowering said support post and cleaning element during movement of the latter to said inoperative position.

6. The combination of claim 5 wherein said last-mentioned means includes elevating and lowering means on said cleaning element and the exterior of said cabinet and means within said cabinet connected to said support post and causing oscillatory movement thereof.

7. The combination of claim 6 wherein said elevating and lowering means comprises a sleeve on said cabinet surrounding and journaling said support post, cooperating cam surfaces on said cleaning element and said sleeve causing vertical movement of said cleaning element in response to oscillatory movement thereof.

8. A record player comprising a cabinet enclosing record player operating mechanism, a turntable mounted upon the top of said cabinet for rotation about a vertical axis and means for reproducing the sound recording of a record disk mounted on said turntable, a record disk cleaner comprising a cleaning element, support means mounting said cleaning element independently of said sound reproducing means for swinging movement in a horizontal plane above said turntable between an operative position above and out of contact with but in closely spaced proximity to a record disk upon said turntable for cleaning said record disk and an inoperative position above and at one side of said record disk and turntable, means for moving said cleaning element from one to the other of said positions, said support means comprises a vertical tubular support post and said cleaning element comprises a horizontal suction head having a suction inlet means upon its lower side overlying said record disk and extending across the sound recording portion of the latter from the center to the outer edge of said disk, means journaling said support post for combined axial and oscillatory movement about its vertical axis when moving between said operative and inoperative positions, means within said cabinet for applying suction to said tubular support post and from the latter to said suction head.

References Cited by the Examiner

UNITED STATES PATENTS

| | | | |
|---|---|---|---|
| 963,515 | 7/1910 | Chapman | 274—47 |
| 2,059,263 | 11/1936 | Miller | 274—47 |
| 2,310,275 | 2/1943 | Beebe | 274—47 |
| 2,338,843 | 1/1944 | Glaser et al. | 274—47 |
| 2,509,307 | 5/1950 | Madera | 274—47 |

NORTON, ANSHER, *Primary Examiner.*

EVON C. BLUNK, *Examiner.*